United States Patent [19]
Fahlman et al.

[11] Patent Number: 5,812,781
[45] Date of Patent: Sep. 22, 1998

[54] SYSTEM FOR ROUTING INCOMING CONNECTION-LESS MESSAGES TO PROCESSES WHICH ARE ALREADY HANDLING MESSAGES FROM SAME SOURCE NODE

[75] Inventors: David Fahlman; Stefan Slattman; Mats Jakobsson, all of Sundsvall, Sweden

[73] Assignee: Telefonaktiebolaget LM Ericsson, Stockholm, Sweden

[21] Appl. No.: 523,375

[22] Filed: Sep. 5, 1995

[30] Foreign Application Priority Data

Sep. 5, 1994 [SE] Sweden .................................. 9402947

[51] Int. Cl.[6] ...................................................... G06F 15/16
[52] U.S. Cl. ............................... 395/200.56; 395/200.68; 395/674
[58] Field of Search ............................... 395/200.15, 674, 395/675, 200.56, 200.6, 200.68, 200.69, 200.7, 200.71, 200.72, 200.73, 200.74

[56] References Cited

U.S. PATENT DOCUMENTS

| | | |
|---|---|---|
| 4,864,559 | 9/1989 | Perlman . |
| 5,546,541 | 8/1996 | Drew et al. ......................... 395/200.15 |
| 5,590,328 | 12/1996 | Seno et al. ............................... 395/675 |
| 5,592,672 | 1/1997 | Grewal et al. ...................... 395/200.15 |

FOREIGN PATENT DOCUMENTS

| | | |
|---|---|---|
| 0 221 360 | 5/1987 | European Pat. Off. . |
| 0 518 581 | 12/1992 | European Pat. Off. . |

Primary Examiner—Richard L. Ellis
Attorney, Agent, or Firm—Burns, Doane, Swecker & Mathis, L.L.P.

[57] ABSTRACT

A message distribution arrangement for controlling messages in a communication system comprising a number of nodes. The arrangement has a central distributing unit for routing incoming messages and means for forming a variable local data on structure for arranging data nodes which are able or allowed to send messages, a database for providing the data structure with information on originating nodes, updating means for updating the data structure. An incoming message from a given originating node is examined if any process is running for any message originating from the same node in which case the message is routed to that process. Otherwise a new process is initiated.

30 Claims, 3 Drawing Sheets

SYSTEM FOR ROUTING INCOMING CONNECTION-LESS MESSAGES TO PROCESSES WHICH ARE ALREADY HANDLING MESSAGES FROM SAME SOURCE NODE

BACKGROUND

The present invention relates to a message distribution arrangement for controlling messages in a communication system. The messages originate from nodes in the communication system and the invention particularly relates to the case when more than one message originates from one and the same node or so called interworking messages. The communication system comprises a distributing unit for routing of incoming messages. The invention furthermore relates to a method for distributing messages or management messages in a communication system, particularly so called interworking messages. Still further the invention relates to a communications system comprising a message distribution arrangement for controlling messages or particularly management messages.

During communication processing in a tele-, or data-communication system the management of the resources has to be handled. Generally management procedures are started at the reception of management messages sent from a node in a network. An intention with management procedures is to prevent the traffic part of the system from selecting less good or even faulty resources. In the management part of the system is also dealt with the termination of communication processes if e.g. a resource is dropped off during communication etc.

In most cases so called management procedures are quite rare and it is therefore preferred that processes are started to handle an incoming management message and then the process is terminated. It is however a problem that management procedures which originate from the same node in the network often interwork with each other wherein sometimes started procedures must be terminated by other incoming messages and e.g. some messages have to be ignored if e.g. a specific procedure is running etc. In known arrangements a complicated control unit is needed to terminate started procedures or processes or to ignore messages. Such a unit is needed to keep track of started processes which have to be terminated if another message is received etc. and to keep control of which messages have to be ignored etc. under certain circumstances.

One way to solve the problem has been to use one or more distribution units or distributors which take care of incoming messages. The distributor(s) then consequently starts a new process to handle the specific messages.

Another way to solve the problem has been to join an already started process and route the incoming messages to the selected process. However, in the case of interworking messages or procedures, both of the above mentioned solutions require a large amount of information to be kept in the distributor. The distributor then must have knowledge about the starting point of all procedures to be able to send termination orders to processes holding procedures which are to be terminated if an incoming message so requires. Both these kinds of solutions work if the messages which are to be handled do not have any relation to each other but they are unsatisfactory when more than one message originate from one and the same node or in the case of so called interworking messages.

SUMMARY

Therefore a message distribution arrangement is needed which can handle more than one message from one and the same node in a communication system. An arrangement is also needed which can handle interworking messages. Still further an arrangement is needed for handling messages coming from one and the same node or interworking messages without the distributing unit having to have knowledge about all procedures, or started procedures that have to be terminated and messages which have to be ignored etc. An arrangement is also needed which is safe and provides an efficient handling and routing of incoming messages in order to provide for an optimal, efficient and correct selection of resources within the traffic part of the system etc. Particularly an arrangement is needed which provides for handling and routing of so called management messages.

Furthermore a method for routing messages fulfilling the above mentioned objects is needed. A particular object is to provide a method for routing management messages, but of course it is also an object of the invention to provide for routing of other kinds of messages as well.

A telecommunications system with an arrangement for distribution of messages, e.g. management messages for routing of the messages is needed particularly when the messages originate from one and the same node or in the case of so called interworking messages.

An arrangement in a communication system and a method respectively is also needed wherein only a minimum of information has to be kept in the distributing unit in the case of more than one message from the same originating node or so called interworking messages or procedures.

Therefore the invention provides a message handling arrangement for controlling messages originating from nodes in a communication system which comprises a central distributing unit for routing incoming messages wherein the distributing unit comprises means for forming a variable local data structure comprising data on nodes which are able to send messages. The arrangement furthermore comprises a database for providing the data structure with information on originating nodes. Furthermore means are provided through which the data structure is updated more or less continuously. It is also provided for identification of the origination of the messages and monitoring or examining means provides for checking if there is any process running for any message having the same originating node as an incoming message. If such a process is already running, the incoming message is routed to that process. If on the other hand no process is running for any message having the same origin, a new process is initiated.

A communication system is therefore also provided which comprises a message distribution arrangement for distribution of messages. The messages originating from nodes of the system are routed by the message distribution arrangement which is provided with information on all nodes within at least a given part of a network and/or on nodes able to or allowed to send messages and the arrangement furthermore comprises means for collecting information about the origination of messages or procedures and means for processing messages as well as means for initiating a process for processing messages if a message is the only message from a given node, i.e. if no process is running for any message having the same origination node as an incoming message and for joining an ongoing process of some other message having the same origination node and for which a process is running.

The invention also provides for a method for controlling management messages which comprises the steps of keeping information on all nodes which are able to send management messages, collecting information on the originating node of each incoming message, receiving an incoming message in a distributing unit and checking if the incoming message is the only message from a given node or if one or more messages already originated from that same node and, depending thereon, via a processing arrangement either initiating a process or providing for joining an ongoing process.

In an advantageous embodiment the database comprises separate database records for each originating node in a given network or in any desired part of a network or any desired distribution area or for nodes able to or allowed to send message of the kind concerned. Alternatively there are combined database records for a number of nodes etc. The data structure has to be up to date which can be provided for in a number of ways.

In a particular embodiment the database has support to send notification messages about changes, creation and/or deletion of a database record. Then the distributing unit can be notified about the change and take the appropriate action to update the data structure, e.g. through adding or removing data objects representing nodes in the database. Furthermore the database is advantageously updated in runtime with information on originating nodes or data objects to make sure that it corresponds to the information about stored database records. Particularly the updating means comprises means for informing the distributing unit on changes in database records. Alternatively the updating means comprises a scanner or similar for scanning of the database to collect information on changes etc. Preferably the scanning is periodic.

In an advantageous embodiment the processing means or the processor provides for termination of procedures in case a particular message has been received. In another advantageous embodiment the processing means, or the process run thereby, provides for ignoring of messages.

Advantageously, when the distributing unit is started up, it is established which nodes that is to be "combined" in the data structure, e.g. depending an ability, allowability or network (part) etc. These are then added to the data structure. As referred to above, the structure can be updated in various ways, e.g. via notifications from database or if e.g. an operator eliminates a node, a notification is dispatched.

In still an advantageous embodiment the distributing unit is allocated to a Fault Tolerant Processor FTP to minimise the risk of the processor crashing due to hardware failure etc. However, this merely relates to an advantageous embodiment it can of course also be an ordinary processor etc. Alternatively the distributing unit can be allocated to a number of processors in order to provide for redundancy. In this case however, only one processor is to be active at a time. In an advantageous embodiment, which however merely is an example of how the data structure can be arranged, a number of other alternatives are of course also possible, the data structure comprises three fields per originating node or data object. In this embodiment the first field may comprise information about the originating point code, OPC whereas the second field comprises information about the sequential order of a message from a given node and finally the third field comprises information about which communication link is used for the originating node to the distributing arrangement.

Particularly the messages are so called Signal Connection Control Part-Connection-Less SCCP-CL messages. Preferably the distributing unit comprises information about all nodes which are able to send management messages.

In a preferred embodiment, when an incoming message is received, the Originating Point Code OPC, if such is used for identification purposes, is compared with the data objects which are contained in the data structure and if there is no correspondence, i.e. if there is no such node, the message will be ignored. If it is established that when a message is incoming or has been received no process is running for any message originating from the same node which has been given an identity in the data structure, then communication with the processing arrangement is provided for forwarding the message to the processing arrangement which then provides for the initiating of a new process. If on the other hand an incoming message is not the "first" message from the given node, i.e. if a process is already running for a message from the same node of origin, then communication with the processing arrangement is already present, and then the message is forwarded to the processing arrangement to join the existing process for messages from one and the same node.

In an advantageous embodiment the processing arrangement comprises a Common Pool Processor CPP.

The invention also relates to a communication system comprising a message distribution arrangement for distributing Connection-Less messages, in an advantageous embodiment so called management messages. The communication system comprises a number of nodes and messages can be sent from a number of nodes, i.e. they originate from the nodes. The messages originating from the nodes are received in the message distribution arrangement for routing thereof. The message distribution arrangement is provided with information about all nodes within at least a given part of the network, which can (are able to or allowed to) send messages and means are provided for collecting information about the origination of the messages and means for checking if any process is running for any message originating from the same node as an incoming message. The arrangement also comprises means for processing messages and for, in the case the message Is the only message from a given node, creating a new process for that message and in the case the message is not the only message from the given node, providing for joining the running process.

BRIEF DESCRIPTION OF THE DRAWINGS

The invention will in the following be described in a nonlimiting way under reference to the accompanying drawings wherein.

DETAILED DESCRIPTION

As already mentioned above, in a particular embodiment management procedures are initiated upon reception of messages sent from a node in a communication network. The messages can particularly be based on SCCP-CL signalling (Signalling Connection Control Part - Connection-Less). The management part of the communication system also provides for termination of a communication process if a resource, (e.g. a time slot in a PCM multiplex) is dropped off during an on-going communication, e.g. a call. Processing of management procedures normally does not occur very often which is one reason that preferably new processes are started for handling an incoming management message and then the process is terminated after processing the message. In the case of interworking messages, started procedures may have to be terminated by other incoming messages and some of the messages may particularly have to be ignored if a particular procedure is running etc. The invention is particularly concerned with interworking messages, even more particularly with so called SCCP-CL messages. According to an advantageous embodiment of the invention a distribution unit or a central distribution unit takes care of all incoming SCCP-CL messages within the network area or within a given part of a network. The distribution unit routes all messages originating from the same node or so called interworking messages to a specific process if such exists. If however no process is running to handle the incoming message, a new process will be initiated. This will be further explained later on under reference to FIGS. 2 and 3. In an advantageous embodiment the arrangement comprises a database DB which comprises a database record for every originating node in the distribution area able to or allowed to send messages. The distribution unit collects unrelated data about all nodes which can send management messages within the area as referred to in the foregoing. The data is then arranged in a dynamic local data structure (see FIG. 1). The data structure is formed when the distributing process is started to store information about message-sending nodes and data objects representing originating nodes stored in the database are added one by one to the data structure DB and will not be removed therefrom until the corresponding database record is removed from the database DB itself. Thus the data structure will contain information about existing or accepted etc. nodes in the given area. The heap related data structure is particularly updated in runtime in order to correspond to the stored database records representing all nodes.

In order to update the data structure, various methods can be used. According to one embodiment, the database DB is periodically scanned by a scanner to see if there are any changes in the data records representing nodes in the area.

Figure 1:
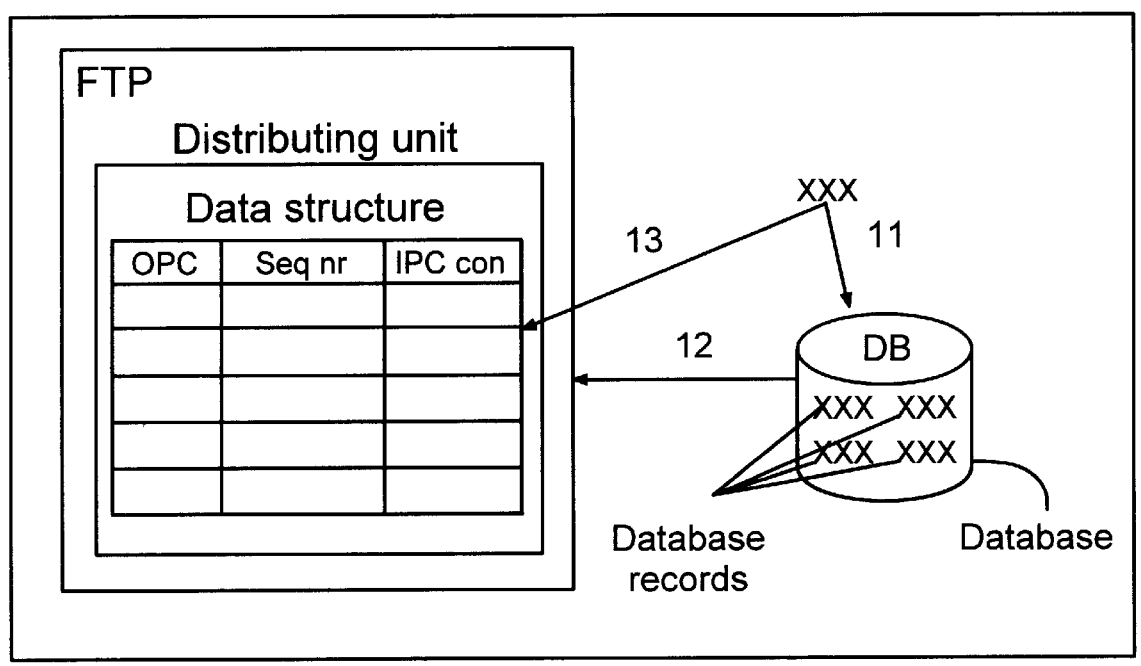
FIG. 1 illustrates the updating of the data structure through notification from a database.

Another still more advantageous embodiment can be applied if the database has support to send notification messages to processes about particular changes in database records such as creation of database records, deletion of database records etc. Then the updating can be effected through a notification of the distributing unit about changes and by taking the appropriate actions to update the data structure through adding or removing data objects representing nodes in the database DB. This embodiment is described in FIG. 1 wherein the data structure comprises three fields per data object. However, the invention is not limited to three fields, this of course being optional. The originating point codes OPC represent the originating nodes of management messages and Seq no indicates the number of messages sent to the process handling messages from that node and Interprocessor Communication Connection IPC con indicates the communication link to the process. If the Seq no is equal to zero, it indicates that no process handling messages from that particular node which is identified by the originating point code OPC is running at the particular time. If however a message is retrieved and no process has been started for messages from that particular node, a new process has to be started and an interprocessor communication connection IPC con has to be established to that process and the message will be forwarded thereto. In FIG. 1 reference numeral 11 illustrates the adding of database records to the database DB which contains the database records. Reference numeral 12 indicates the sending of notification about creation whereas reference numeral 13 indicates the adding of data to the datastructure. In an advantageous embodiment the distributing unit is allocated to a Fault Tolerant Processor FTP in order to minimize the risk of processor crash because of hardware failure etc.

However also other processors can be used etc. as well as the distributor may be allocated to a number of processors. In the latter case, however, only one distributor may be of "activated" at a time.

Upon reception of e.g. SCCP-CL messages in the distributing unit, the Originating Point Code OPC will be retrieved from the message. As already mentioned, the originating point code OPC identifies one unique node in the given network area which as already referred to can be the network or any desired part of the network, allowed or enabled nodes etc. The Originating Point Code OPC will be compared to objects present in the datastructure and if there is no matching object, the message will be ignored (in a particular embodiment). If however the originating point code OPC is found to be valid, i.e. there exists a matching object in the datastructure, the sequence number will be increased by one to keep track of messages which have been sent to the particular process. By the mere forwarding of the message to a process handling messages which originate from one and the same node, all interactions will be taken care of within that process and the distributing unit thus does not have to have knowledge about started procedures that will be terminated and about messages which have to be ignored etc.

Figure 2:
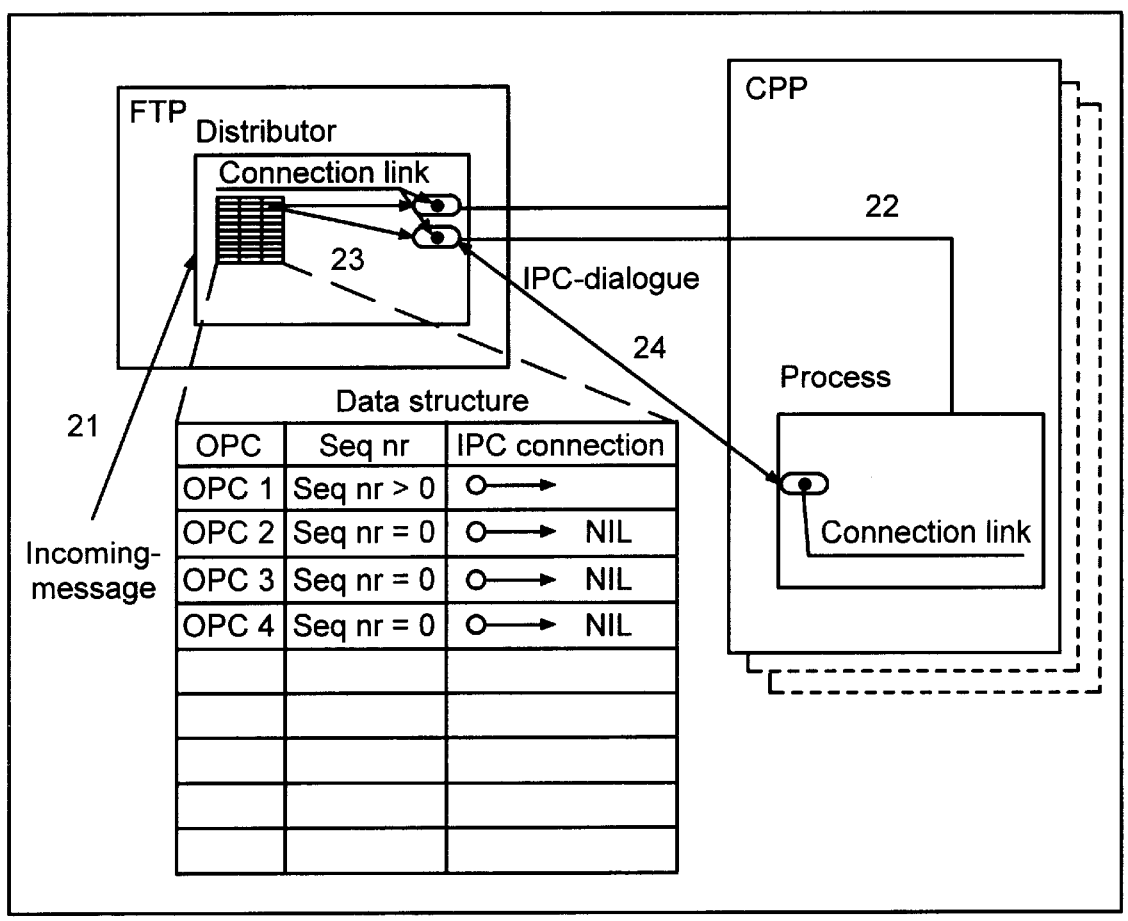
FIG. 2 illustrates the initiation of a process upon reception of a message from a given node and no process is running for any other message originating from the same node and FIG. 3 illustrates the joining of an already existing process for messages from one and the same origination node.

FIG. 2 relates to the case when an incoming message is the "first" message coming from a particular node. In this case there is no process available or running. Thus a new process has to be started up. Consequently, if no process is started and, running for an incoming message from the given node, a new process has to be started and a communication link has to be established. When the link has been established, the message can be forwarded to the started process. When an incoming management message, particularly a SCCP-CL message, is received by the distributing unit as Indicated by arrow 21, the originating Point Code OPC will be retrieved from the message. The Originating Point Code OPC will then be compared with the content of the datastructure. In the cases illustrated in FIG. 2, an Originating Point Code OPC 2 was carried by the incoming message and will therefore match the second row in the datastructure. However, the second row indicates that no process is started or running handling messages from the node as identified by OPC, i.e. the sequence number is equal to zero. A new process then has to be started as indicated by arrow 22 and the new communication link is established 23. When the communication link, particularly IPC-dialogue, is established, the message will be forwarded to the started process 24. When the message has been sent, the sequence number will be increased by one and the pointer to the connection link will be stored in the datastructure. NIL means the null pointer.

Figure 3:
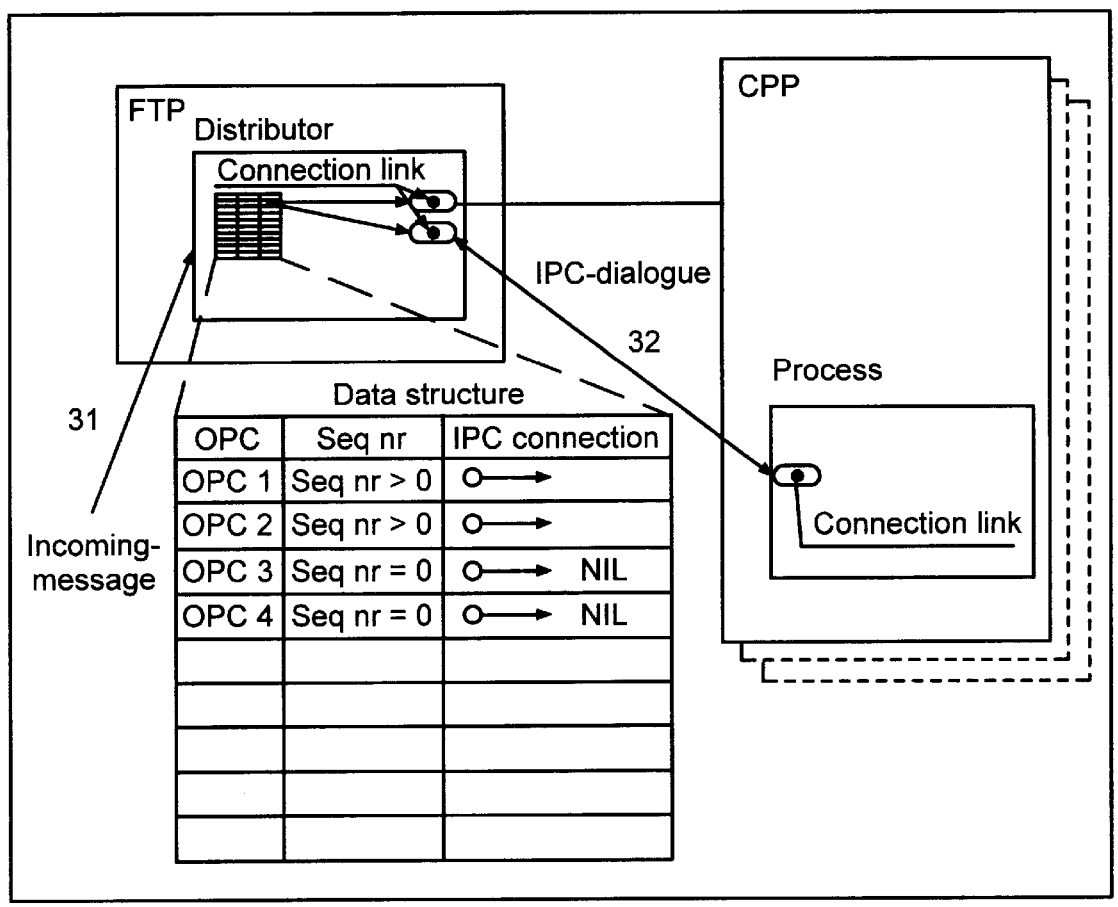

FIG. 3 illustrates the case when an incoming management message from a given node is not the "first" message from the particular node, i.e. when a process is already running, for messages from the given node. Thus, the process is running for an incoming message from a particular node and a communication link is already established. The message is therefore forwarded to the processing means which in a particular embodiment is a Common Pool Processor CPP and to the process run thereby.

When thus an incoming management message 31, particularly a SCCP-CL message, is received by the distributing unit, the originating point code OPC will be retrieved from the message. The originating point code of the message will then be compared to the content of the datastructure and if e.g., OPC 2 is carried by an incoming message, then it will match the second row in the datastructure as in the preceding case described in FIG. 2. The second row indicates that a process is already running handling messages from the particular node as identified by the originating point code OPC and the sequence number is greater than zero. The message will then be forwarded (32) to the running process. When the message has been sent, the sequence number will be increased by one as in the preceding case.

Upon forwarding through the distributing unit of a message, the sequence number is passed along over the communication link. As already described above, the sequence number is increased for each message which is sent to a started process. The first message carries the sequence number 1 and the second message sequence number 2 etc. The process of the processing means holds information about the latest sequence number sent as well as it holds information about procedures running in the process. When the process finds out that no procedure is running and that no new incoming message is received, a termination request will be sent to the distributing unit through the communication link. The sequence number carried by the termination request is then compared to the sequence number in the datastructure of the distributing unit. If the sequence numbers are equal, the process will be deleted and the communication link will be disconnected. This relates to an advantageous embodiment through which the risk of message collision is eliminated. If the message is sent from the distributing unit at the same time as the termination request is sent from the process of the processing means, the sequence numbers will be different and the process will not be terminated. Upon termination of a process, the sequence number will be set to zero.

Finally, by the mere forwarding of a message to a process handling messages originating from the same node all interactions will be taken care of within the process and the central distributing unit will be left out of all knowledge about started procedures which have to be terminated, messages to be ignored etc.

Through the invention, a minimum of information has to be kept in the distributing unit in the case of interworking messages or procedures. The processing means or the process may particularly provide for termination of procedures due to the incoming of certain messages etc. In a particular embodiment, the process also provides for the ignoring of messages.

The invention can of course be varied in a number of ways and relates to tele-, as well as datacommunication systems and is of course not limited by the described embodiments but merely by the scope of the claims.

What is claimed is:

1. A message handling apparatus for controlling messages originating from nodes in a communication system, the message handling apparatus comprising:
   a central distributing unit for routing incoming connectionless messages,
   means for forming a variable local data structure for maintaining information on originating nodes, which nodes can or are allowed to send messages,
   a database for providing the data structure with information on said originating nodes, said information including information on existing or accepted nodes
   means for updating the data structure,
   a message processing arrangement,
   means for determining from which node a message originates,
   means for examining if a process is running in response to a message from an originating node,
   wherein for an incoming message the originating node is determined and if any process is running in response to a message originating from the same node, the message is routed to the running process for processing, and if there is no process running for any message from the same originating node, a new process is started for processing the message, and
   means for sending notification messages to processes about particular changes in database records.

2. The message handling apparatus of claim 1, wherein the messages are management messages.

3. The message handling apparatus of claim 1, wherein the database includes a separate database record for every originating node in a given network or distribution area.

4. The message handling apparatus of claim 1, wherein the updating means comprises means for informing the distributing unit of changes in database records.

5. The message handling apparatus of claim 4, wherein the database is updated in runtime with information on originating nodes in order to update the data structure.

6. The message handling apparatus of claim 4, wherein the database has support to send notification messages to the distribution unit regarding changes in particular database records.

7. The message handling apparatus of claim 4, wherein the updating means comprises scanning means for periodically scanning the database.

8. The message handling apparatus of claim 1, wherein the data structure comprises three fields per originating node or data object.

9. The message handling apparatus of claim 8, wherein a first field comprises Originating Point Code information for providing identification of an originating node.

10. The message handling apparatus of claim 9, wherein upon reception of an incoming message, the Originating Point Code thereof is compared to data objects in the data structure and if no corresponding data object is found, the message is ignored.

11. The message handling apparatus of claim 8, wherein a second field comprises information on a sequential order of messages from a given node for which a process is running.

12. The message handling apparatus of claim 8, wherein a third field comprises information on an identity of a communication link that is used between an originating node and a distributing arrangement.

13. The message handling apparatus of claim 1, wherein the messages are Signalling Connection Control Part-Connection-Less messages.

14. The message handling apparatus of claim 1, wherein the central distributing unit contains information on all nodes having the ability to send messages.

15. The message handling apparatus of claim 1, wherein the message processing arrangement comprises a Common Pool Processor.

16. The message handling apparatus of claim 1, wherein the central distributing unit is allocated to a Fault Tolerant Processor.

17. The message handling apparatus of claim 1, wherein the central distributing unit is allocated to one or more message processing arrangements in such a way that only one central distributing unit is active at a time.

9

18. The message handling apparatus of claim 1, wherein said particular changes in the database records include creation of database records or deletion of database records.

19. A message handling apparatus for controlling messages originating from nodes in a communication system, the apparatus comprising:

a central distributing unit for routing incoming connectionless messages, wherein the central distributing unit comprises a variable local data structure having information on originating nodes which are allowed to send messages, said information including information on existing or accepted nodes; and the variable local data structure comprises a first field containing Origination Point Code-information providing information on an originating node, a second field containing information on a sequential order of messages from a given node for which a process is running, and a third field containing information on communication links between originating nodes used for the message handling apparatus;

a database for providing the data structure with information on the originating nodes;

means for updating the data structure;

means for identifying the originating node of an incoming message, a message processing arrangement, means for examining if, when a message is received from an originating node, any process is running processing in response to any message originating from the same originating node in which case the message is routed to the running process for processing, and if there is no process running for any message from the same originating node, a new process is started for processing the message, and means for sending notification messages to processes about particular changes in database records.

20. The message handling apparatus of claim 19, wherein the messages are Signalling Connection Control Part-Connection-Less messages (SCCP-CL).

21. The message handling apparatus of claim 19, wherein a message is ignored if no data object corresponding to its originating node is found in the data structure.

22. The message handling apparatus of claim 19, wherein the message processing arrangement comprises a Common Pool Processor.

23. The message handling apparatus of claim 20, wherein the central distributing unit is allocated to a Fault Tolerant Processor.

24. The message handling apparatus of claim 19, wherein said particular changes in the database records include creation of database records or deletion of database records.

25. A communication system having a plurality of nodes, comprising:

a message distribution arrangement for distributing messages, wherein messages originating from nodes are received in a central message distribution unit for routing of the messages, and the message distribution arrangement is provided with information on nodes of at least a given part or category or similar aspect of the network, said information including information on existing or accepted nodes;

means for collecting information about the origination of the messages;

means for processing messages by which a process for processing messages is initiated if there is no process running in response to any message from the same originating node as an incoming message, and by which the message is processed by an ongoing process processing messages from that node if the message is not the only message from the same originating node; and means for sending notification messages to processes about particular changes in database records.

26. The communication system of claim 25, wherein the messages are management messages.

27. The communication system of claim 25, wherein said particular changes in the database records include creation of database records or deletion of database records.

28. A method for controlling messages in a communication system having a plurality of nodes from which messages are sent, the method comprising the steps of:

maintaining information on nodes which are capable of sending messages, said information including information on existing or accepted nodes collecting information on an originating node corresponding to an incoming message, receiving the incoming message in a central distributing unit, checking if the originating node corresponding to the incoming message is a same originating node as for any other message for which a process is running and if not, providing communication with a message processing arrangement, the message processing arrangement initiating a new process, and if a process is running for any message having the same originating node, providing communication with the process processing messages of the same originating node without the distributing unit taking part in the processing of the message, and sending notification messages to processes about particular changes in database records.

29. The method of claim 28, wherein the messages are management messages.

30. The method of claim 28, wherein said particular changes in the database records include creation of database records or deletion of database records.

* * * * *